United States Patent
Miyata et al.

(10) Patent No.: US 9,153,955 B2
(45) Date of Patent: Oct. 6, 2015

(54) COMMUNICATION LINE ISOLATOR

(71) Applicant: SANKOSHA CORPORATION, Shinagawa-Ku, Tokyo (JP)

(72) Inventors: Junpei Miyata, Tokyo (JP); Hidetoshi Ito, Tokyo (JP)

(73) Assignee: Sankosha Corporation, Tokyo (JP)

( * ) Notice: Subject to any disclaimer, the term of this patent is extended or adjusted under 35 U.S.C. 154(b) by 239 days.

(21) Appl. No.: 13/860,701

(22) Filed: Apr. 11, 2013

(65) Prior Publication Data

US 2013/0286527 A1 Oct. 31, 2013

(30) Foreign Application Priority Data

Apr. 26, 2012 (JP) ................. 2012-100622

(51) Int. Cl.
*H02H 9/04* (2006.01)
*H02H 1/04* (2006.01)

(52) U.S. Cl.
CPC . *H02H 9/04* (2013.01); *H02H 1/04* (2013.01); *H02H 9/042* (2013.01)

(58) Field of Classification Search
CPC ............ H02H 1/04; H02H 9/04; H02H 9/042
USPC ........................................................ 361/119
See application file for complete search history.

(56) References Cited

U.S. PATENT DOCUMENTS

| | | | | |
|---|---|---|---|---|
| 5,208,723 A * | 5/1993 | Jenne | ............................ | 361/119 |
| 5,548,265 A * | 8/1996 | Saito | ............................ | 336/200 |
| 5,923,709 A * | 7/1999 | Keel et al. | ...................... | 375/257 |
| 5,982,595 A * | 11/1999 | Pozzuoli | ........................ | 361/62 |
| 6,881,096 B2 * | 4/2005 | Brown et al. | ............. | 439/620.01 |
| 2004/0257743 A1* | 12/2004 | Chen et al. | ..................... | 361/119 |
| 2008/0198527 A1 | 8/2008 | Higashi et al. | | |

FOREIGN PATENT DOCUMENTS

| | | |
|---|---|---|
| JP | 10-064740 A | 3/1998 |
| JP | 11-341677 A | 12/1999 |
| JP | 2005-151705 A | 6/2005 |
| JP | 2008-136303 A | 6/2008 |
| JP | 2008-206263 A | 9/2008 |
| JP | 2011-010085 A | 1/2011 |

* cited by examiner

*Primary Examiner* — Thienvu Tran
*Assistant Examiner* — Kevin J Comber
(74) *Attorney, Agent, or Firm* — Carrier Blackman & Associates, P.C.; Joseph P. Carrier; William D. Blackman

(57) ABSTRACT

An isolator 10 is formed with an isolation transformer 13 that blocks an abnormal voltage entering from a communication line 30 and protects a protection target device 40. A pulse transformer 43 in the device 40 includes a primary winding 43$a$ connected to a secondary winding 13$b$ of the transformer 13 and a secondary winding 43$b$ connected to an inner circuit. A medium tap of the primary winding 43$a$ is grounded through an inner capacitance Ci of the device 40. A parasitic capacitance Cs between the primary winding 13$a$ and the secondary winding 13$b$ of the transformer 13 and the inner capacitance Ci are connected in series, an abnormal voltage is divided by the capacitance Cs and the capacitance Ci, and a capacitance value of the capacitance Cs is set such that the divided voltage of the capacitance Ci is equal to or below a predetermined value.

11 Claims, 12 Drawing Sheets

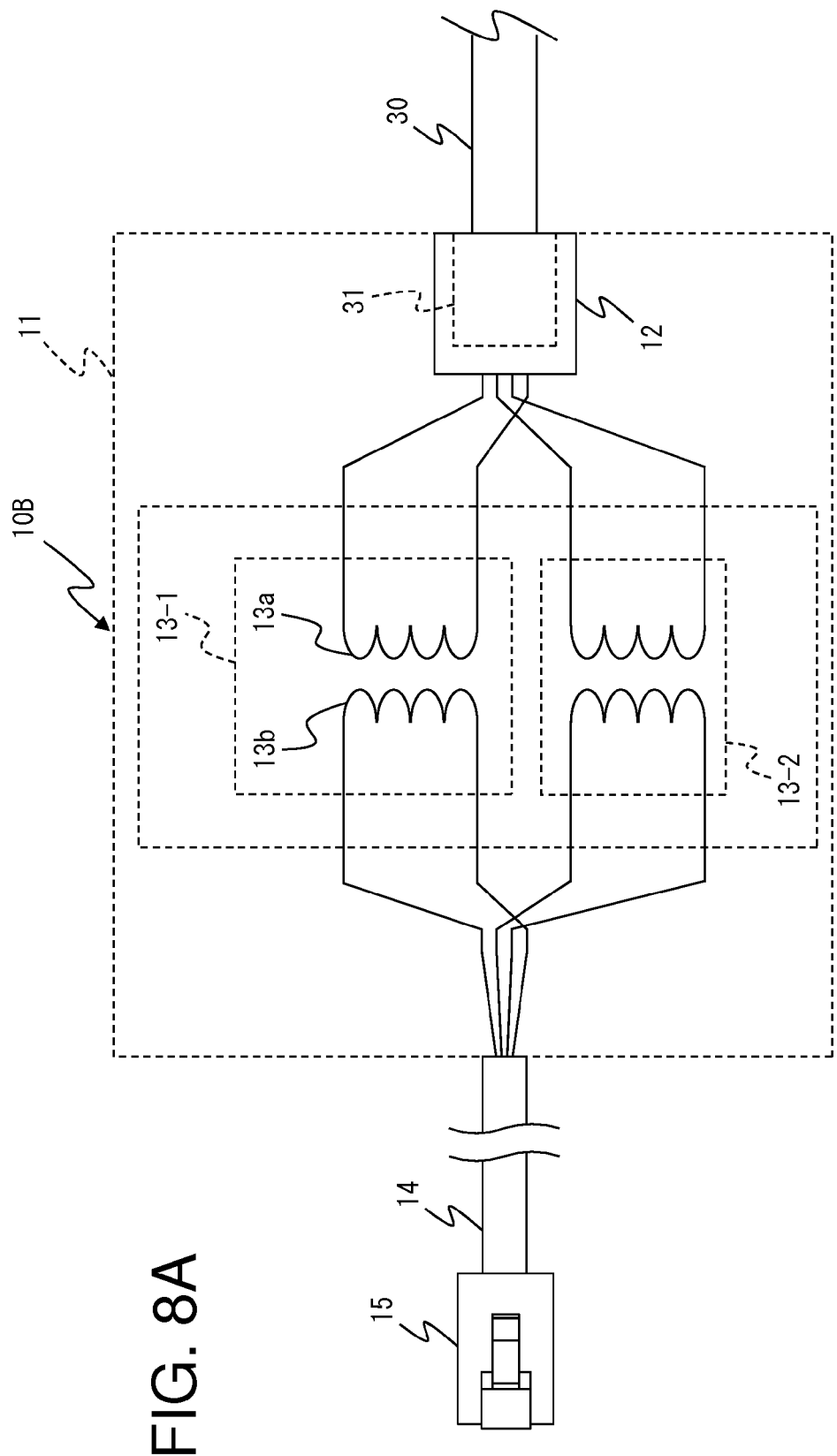

COMMUNICATION LINE ISOLATOR

BACKGROUND ART

1. Field of the Invention

The present invention relates to a communication line isolator (which is referred to as, for example, a surge protective device (hereinafter referred to as "SPD") for LAN) arranged so as to intervene in a communication line in order to protect protection target devices corresponding to communication devices including an optical network unit (hereinafter referred to as "ONU"), a home gateway (hereinafter referred to as "HGW"), a personal computer (hereinafter referred to as "PC") and a modem, which are connected to a communication line such as a local area network (hereinafter referred to as "LAN") line. In particular, the present invention relates to an isolation-type communication line isolator having high pressure resistance performance (e.g. isolation-type LAN SPD).

2. Description of the Related Art

In order to protect communication devices corresponding to protection target devices from an abnormal voltage or abnormal current such as a lightning surge which enters from a power wire, communication wire or grounding wire, the SPD is installed in each wire. SPD's are broadly classified into two types (i.e. current release type and isolation type) as described below.

As a current-release-type SPD in the related art, for example, there are known a current-release-type SPD for power disclosed in Japanese Patent Laid-Open No. 2008-206263 and a current-release-type SPD for communication disclosed in Japanese Patent Laid-Open No. 11-341677. These current-release-type SPD's are formed with an arrester, varistor and so on, and these components are grounded. As an operation, by causing the SPD to accept an abnormal current and release the abnormal current to the ground side, the abnormal current is prevented from entering the communication device side.

Also, as an isolation-type SPD in the related art, for example, there are known an isolation type SPD for power disclosed in Japanese Patent Laid-Open No. 2005-151705 and an isolation type SPD for communication disclosed in Japanese Patent Laid-Open No. 10-64740. These isolation-type SPD's are formed with an isolation voltage inverter (i.e. isolation transformer), and, although there are many SPD types that are grounded by setting an electrostatic shield to the isolation transformer, there are SPD types that are not grounded. As an operation, by causing the isolation transformer to intervene in a line of a power wire or communication wire, an isolation unit is formed in the line, and therefore an abnormal current does not enter the communication device side as long as the isolation transformer is not destroyed.

When the isolation-type SPD is explained, an isolation transformer used in this isolation-type SPD has a parasitic capacitance between a primary winding and a secondary winding. Therefore, even if the primary side corresponding to the power wire side or the communication wire side and the secondary side corresponding to the power device side or communication device side are isolated using an isolation transformer, part of an abnormal current such as a lightning surge which enters from the primary winding side of the isolation transformer passes to the secondary winding side of the isolation transformer by capacitive coupling by the parasitic capacitance.

To cope with such a pending problem, like the isolation-type SPD's disclosed in Japanese Patent Laid-Open No. 2005-151705 and Japanese Patent Laid-Open No. 10-64740 of the related art, it is desirable to basically set an electrostatic shield between the primary winding side and the secondary winding side of an isolation transformer and fasten this electrostatic shield to the ground. By this means, it is possible to suppress an abnormal current flowed from the primary winding side to the secondary winding side (i.e. it is possible to extremely lower a so-called surge change ratio) and therefore it is possible to reliably protect a power device or communication device from an abnormal current or abnormal voltage. Also, there is a method of preventing an abnormal current or abnormal voltage from intervening in the power device side or communication device side by setting a release-type SPD before the first winding side of the isolation transformer or after the secondary winding side of the isolation transformer and fastening a ground terminal of this release-type SPD to the ground.

Next, an explanation is given to a LAN SPD which is an "isolation type" and "does not require grounding" in the related art.

In recent years, regarding a communication line corresponding to a communication wire, a LAN line becomes common. Communication devices such as an ONU, an HGW and a PC connected to the LAN line include, for example, a LAN connector connected to the LAN line, a pulse voltage inverter (i.e. pulse transformer) connected to this LAN connector and a LAN controller that is connected to this pulse transformer and transmits and receives pulse signals. To protect such a communication device from an abnormal voltage or abnormal current such as a lightning surge, the LAN SPD as disclosed in Japanese Patent Laid-Open No. 2011-10085 of the related art is also installed between the communication device and the LAN line.

For example, in a communication device installed in an average house or building's office, since a ground terminal is often installed in a predetermined limited place, there are many cases where it is difficult to lay a grounding wire from the LAN SPD toward the ground terminal. Therefore, as the LAN SPD used in an average house or building's office, there are many cases where an SPD which is an "isolation type" and "does not require grounding" is required. This kind of SPD is disclosed in, for example, Japanese Patent Laid-Open No. 2008-136303 of the related art.

However, the isolation-type LAN SPD which is one of communication line isolators in the related art has following problems (a) and (b).

(a) Regarding Cooperation Problem

A withstand voltage value of an isolation-type LAN SPD using an isolation transformer in the related art is often designed to around 5 kV. This is because of considering the reality that an abnormal voltage of a lightning surge which enters a LAN line is often equal to or below 5 kV. Further, when an excessive voltage of around 5 kV is applied to the primary side of the LAN SPD, although a voltage is caused on the secondary side of the LAN SPD by capacitive coupling of an isolation transformer, the voltage caused on the secondary side is around 1 kV at a maximum. A communication device connected to the secondary side of the LAN SPD normally has a structure to withstand a voltage of around 1 kV.

Meanwhile, according to the latest studies and field investigation report in recent years, a case is reported where a lightning surge of around 13 kV with an impulse waveform of 10/700 μs (i.e. a lightning surge with a waveform which: reaches the maximum voltage of 13 kV at the timing a time of 10 μs passes from the rising start timing; after that, gradually attenuates; and, at the timing a time of 700 μs passes from the rising start timing, attenuates up to 7.5 kV, which is a half voltage of the maximum voltage of 13 kV) occurs. Therefore, there is a need to improve a withstand voltage of the LAN SPD up to around 13 kV.

To improve the withstand voltage of the LAN SPD itself, the design of an isolation transformer system (e.g. shape) has to be changed.

However, simply, in a case where the withstand voltage performance of the LAN SPD is improved to around 13 kV, the following harmful effect may occur.

For example, when an excessive voltage of around 10 kV is applied to the primary side of the LAN SPD, although a voltage is caused on the secondary side of the LAN SPD by capacitive coupling of an isolation transformer, the voltage caused on the secondary side is several kV (this voltage is larger than 1 kV, the withstand voltage of the communication device on the secondary side) and therefore a communication device on the secondary side may be damaged. In other words, when an excessive voltage of 10 kV which the LAN SPD can withstand is caused, the LAN SPD itself may not be damaged but the communication device on the secondary side may be damaged.

Therefore, it is requested to develop an LAN SPD that not only improves the withstand voltage of the LAN SPD simply but also does not damage the communication device on the secondary side even if the withstand voltage of the LAN SPD is improved.

(b) Regarding Chassis of LAN SPD

In a case where the withstand voltage performance of a LAN SPD is improved up to around 13 kV and a lightning surge of around 20 kV over the withstand voltage performance of the LAN SPD is applied to the LAN SPD, an isolation transformer inside the LAN SPD is subjected to breakdown (i.e. aerial discharge between the primary wire side and the secondary wire side of the isolation transformer), thereby flowing out an excessive abnormal current from the primary wire side to the secondary wire side of the isolation transformer. At this time, in a chassis housing the LAN SPD, an inner pressure is rapidly increased by thermal expansion of air due to an abnormal current.

Here, for example, if the chassis of the LAN SPD having high pressure resistance performance is formed with an isolation member such as a synthetic resin as disclosed in the related art, it is not possible to withstand a rapid increase of chassis inner pressure at the time an abnormal current occurs, and the chassis may burst swiftly. Further, when the chassis bursts, fragments of the chassis fly off and therefore a risk to users is concerned.

Therefore, it can be considered to form the chassis with metal members so as not to burst the chassis of the LAN SPD in a case where a lightning surge over the withstand voltage performance of the LAN SPD is applied to the LAN SPD. However, in the case of the chassis made of metal members, since the chassis is a conductor, it is necessary to make an isolation distance between the chassis and the SPD inner circuit larger than that of the chassis made of isolation members, and thereby the LAN SPD itself becomes large and its cost increases.

Therefore, it is requested to develop a small LAN SPD that not only improves the withstand voltage of the LAN SPD simply but also does not burst a chassis made of isolation members even if the withstand voltage of the LAN SPD is improved.

SUMMARY OF THE INVENTION

Therefore, to solve the foregoing problem of the related art, the first object of the present invention is to provide a communication line isolator that does not damage a protection target device on the secondary side even if the withstand voltage of the communication line isolator is improved. Further, the second object of the present invention is to provide a small communication line isolator that does not burst a chassis made of isolation members even if the withstand voltage of the communication line isolator is improved.

To achieve the first object, a communication line isolator of the first invention in the present invention is configured with an isolation transformer including a primary winding connected to a communication line and a secondary winding connected to a protection target device that performs communication with the communication line, and blocks an abnormal voltage entering from the communication line to protect the protection target device. The protection target device has a pulse transformer and an inner circuit configured to transmit/receive a pulse signal to/from the communication line via the pulse transformer and perform the communication, the pulse transformer includes a primary winding connected to a side of the secondary winding of the isolation transformer and a secondary winding connected to an inner circuit side of the protection target device, and a medium tap in the primary winding of the pulse transformer is grounded through the inner capacitance of the protection target device. Further, a parasitic capacitance caused between the primary winding and the secondary winding in the isolation transformer and the inner capacitance are connected in series such that the lightning surge is divided by the parasitic capacitance and the inner capacitance, and a capacitance value of the parasitic capacitance is set such that a divided voltage of the inner capacitance is equal to or below a predetermined value.

To achieve the second object, a communication line isolator of the second invention in the present invention is the communication line isolator of the first invention, where: the isolation transformer is stored in a chassis formed with an isolation member (e.g. synthetic resin member) and is externally attached to the protection target device; a pressure release hole is formed in an outer surface of the chassis; and the hole is sealed by a seal that can be opened when an inner pressure of the chassis increases.

According to the communication line isolator of the first invention, an isolator is formed using an isolation transformer having a parasitic capacitance, such that: an abnormal voltage is divided by a combined capacitance in which the parasitic capacitance of the isolation transformer and the inner capacitance in the protection target device are connected in series; and the divided voltage of the inner capacitance is equal to or below a predetermined value. Therefore, it is possible to simply and accurately realize a high-withstand-voltage isolation-type isolator without applying an excessive divided voltage to the protection target device side and causing a bad effect of damaging the protection target device even if the isolator is subjected to a high withstand voltage.

According to the communication line isolator of the second invention, an isolation transformer is stored in a chassis formed with an isolation member, a pressure release hole is formed in the chassis to prevent a burst of the chassis at abnormal time (i.e. at the time an inner pressure increases), and the hole is sealed by a seal. Therefore, at normal time, it is possible to prevent invasion of dust or damp from the hole into the chassis, and, at abnormal time (i.e. at the time the inner pressure increases), since the seal is removed or broken, it is possible to let out the inner pressure and prevent a burst of the chassis. Therefore, it is possible to realize a communication line isolator in which, regardless of the chassis formed with the isolation member, the chassis is not burst even by an increase of the inner pressure.

The foregoing and other objects and new features of the present invention will be clarified when the description of the preferred embodiments below is read against the accompanying drawings. However, the drawings below are mainly provided for explanation and do not limit the scope of the present invention.

BRIEF DESCRIPTION OF THE DRAWINGS

FIG. 8A is a rough circuit configuration diagram illustrating a communication line isolator 10B according to a third embodiment of the present invention;

DESCRIPTION OF THE PREFERRED EMBODIMENTS

First Embodiment (Configuration in First Embodiment)

Figure 1A:
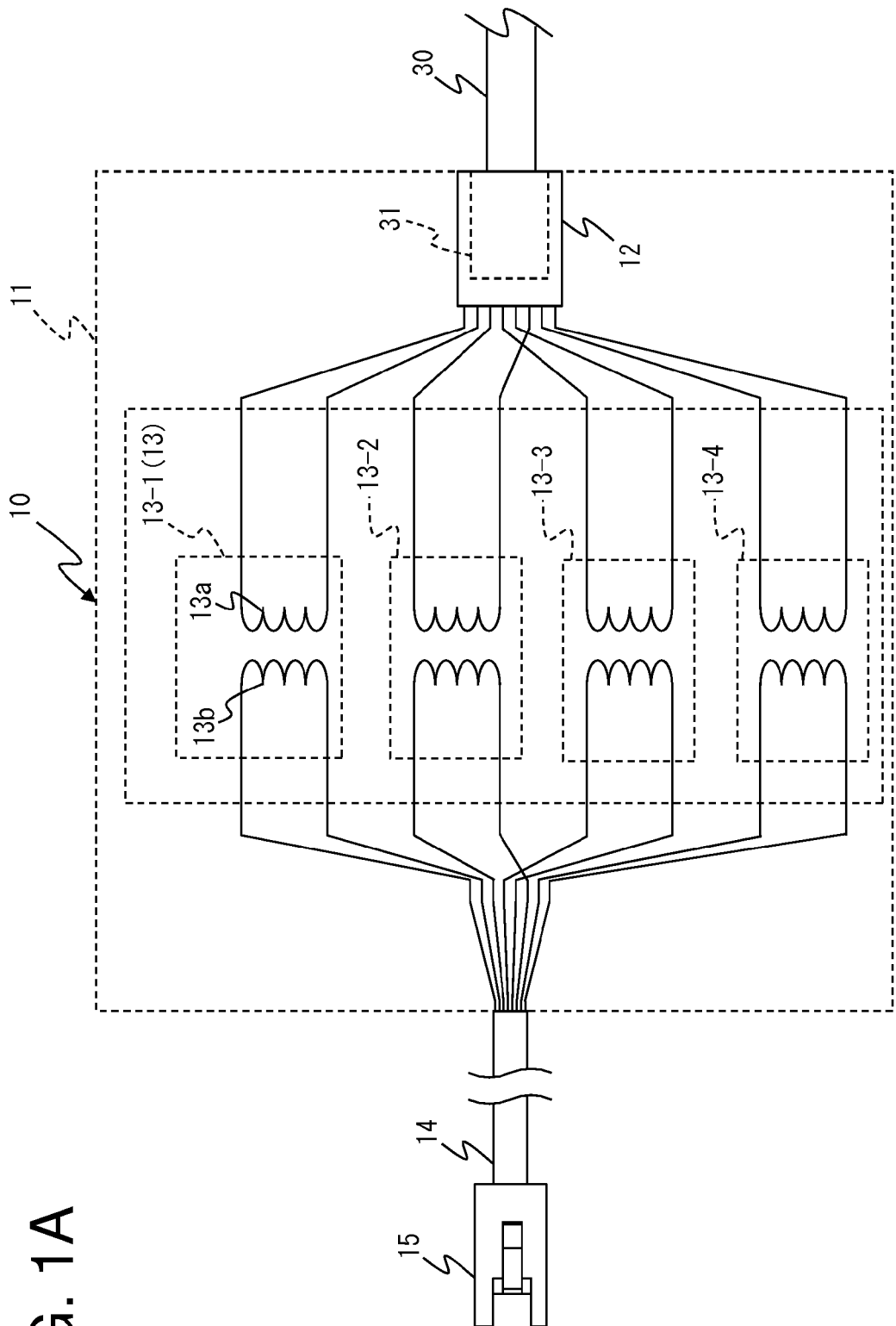
FIG. 1A is a rough circuit configuration diagram illustrating a communication line isolator 10 according to a first embodiment of the present invention.
Figure 1B:
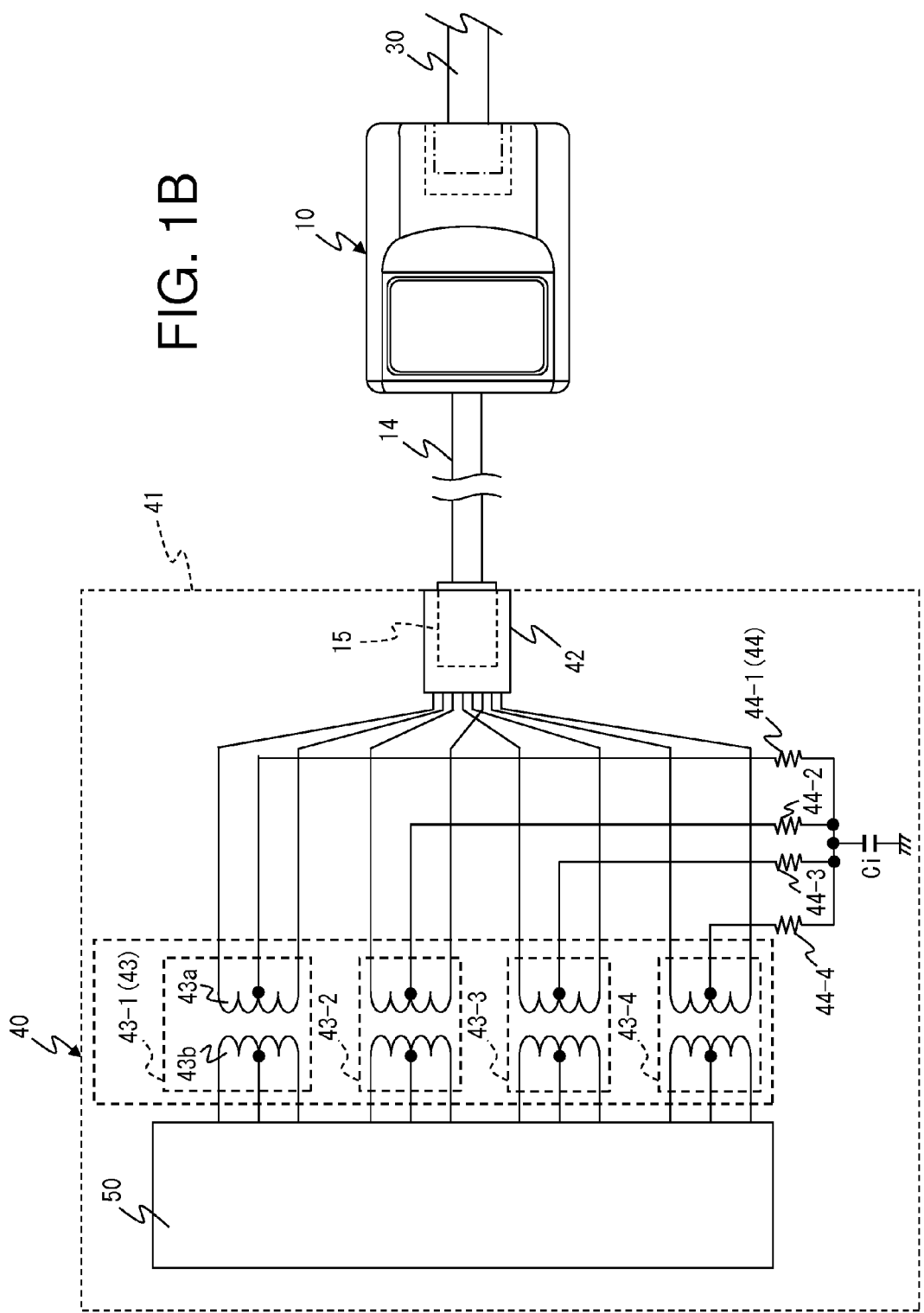
FIG. 1B is a rough circuit configuration diagram illustrating a protection target device 40 according to the first embodiment of the present invention.

FIG. 1A is a rough circuit configuration diagram illustrating a communication line isolator 10 according to a first embodiment of the present invention and FIG. 1B is a rough circuit configuration diagram illustrating a protection target device 40 according to the first embodiment of the present invention.

As illustrated in FIG. 1A and FIG. 1B, the communication line isolator 10 according to the first embodiment is an external isolation-type LAN SPD (e.g. 1000Base-T SPD corresponding to gigabit Ethernet (registered trademark) standard) with high pressure resistance performance and without grounding. This isolator 10 is detachably connected between a communication line (e.g. LAN cable formed with four twisted pairs of wires or eight wires as a LAN line) 30 and a protection target device 40 corresponding to a communication device.

The isolator 10 has a chassis 11 formed with an isolation member (e.g. synthetic resin member). A first connector (e.g. eight-position modular jack) 12 for input and output is attached to one side surface out of the facing side surfaces of the chassis 11. An eight-position modular plug 31 connected to a terminal unit of the LAN cable 30 is detachably attached to this modular jack 12. In the chassis 11, four isolation transformers 13 (=13-1 to 13-4) are stored. Each isolation transformer 13 includes a primary winding 13a and a secondary winding 13b wound around a core, each primary winding 13a is connected to the modular jack 12 and each secondary winding 13b is connected to one end of the LAN cable 14 formed with four twisted pairs of wires or eight wires. There is a parasitic capacitance Cs between the primary winding 13a and the secondary winding 13b of each isolation transformer 13.

The other end of the LAN cable 14 is pulled out from the other side surface of the chassis 11 to the outside, and a second connector for input and output (e.g. eight-position modular plug) 15 is connected to the other end of the LAN cable 14. The modular plug 15 is detachably attached to the protection target device 40.

The protection target device 40 includes, for example, an ONU, an HGW and a PC, and each component is stored in the chassis 41 as follows. A connector for input and output (e.g. eight-position modular jack) 42 is attached to an outer surface (e.g. side surface) of the chassis 41. The modular jack 42 is detachably attached to the modular plug 15 on the side of the isolator 10. In the chassis 41, four pulse transformers 43 (=43-1 to 43-4) for input and output, four resistances 44 (=44-1 to 44-4) for impedance matching, a common inner capacitance Ci and a communication controller (e.g. LAN controller) 50 as an inner circuit or the like are stored.

Each pulse transformer 43 transmits a pulse signal for transmission and reception and includes a primary winding 43a and a secondary winding 43b wound around a core, each primary winding 43a is connected to the modular jack 42 and each secondary winding 43b is connected to the LAN controller 50. In the primary winding 43a of each pulse transformer 43, a medium tap corresponding to a center tap is connected (i.e. grounded) to a frame grounding terminal of the chassis 41 via each resistance 44 and the common inner capacitance Ci. For example, the resistance value of each resistance 44 is 75Ω and the capacitance value of the common inner capacitance Ci is 1000 pF.

The LAN controller 50 has a transmission and reception function to transmit and receive a transmission pulse signal and a reception pulse signal in a switching manner, and, at the time of transmission, transmits transmission pulse signals generated in an non-illustrated protection target device itself to the secondary windings 43b of four pulse transformers 43 (=43-1 to 43-4), and, at the time of reception, receives reception pulse signals transmitted from the secondary windings 43b of four pulse transformers 43 (=43-1 to 43-4) and gives them to the non-illustrated protection target device itself.

Figure 2A:
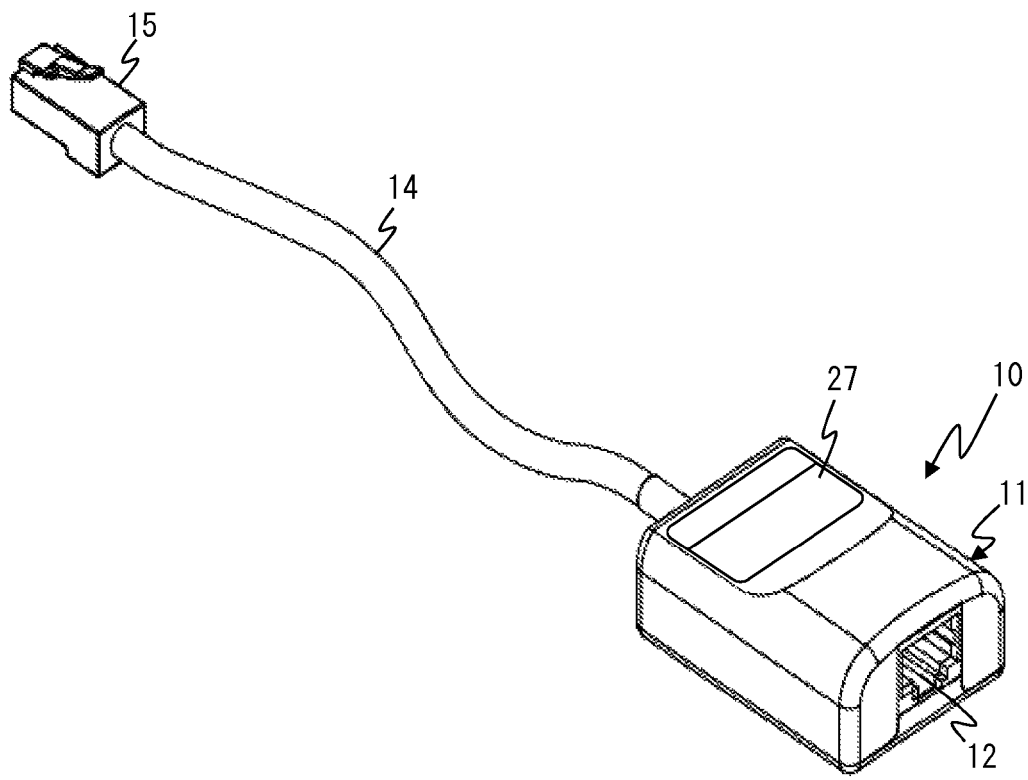
FIG. 2A and FIG. 2B are perspective views illustrating an outline of an isolator 10 in FIG. 1B.
Figure 2B:
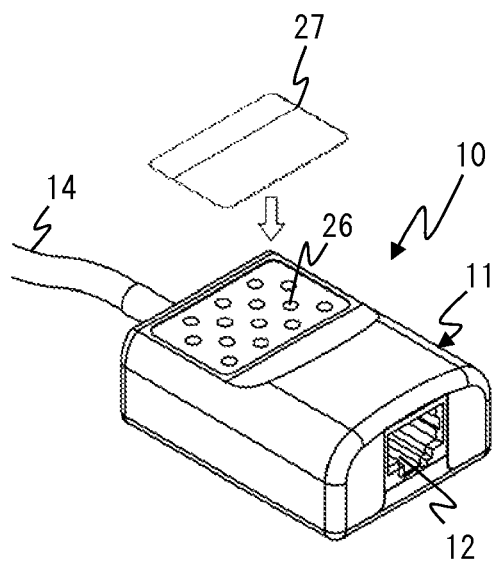
Figure 3A:
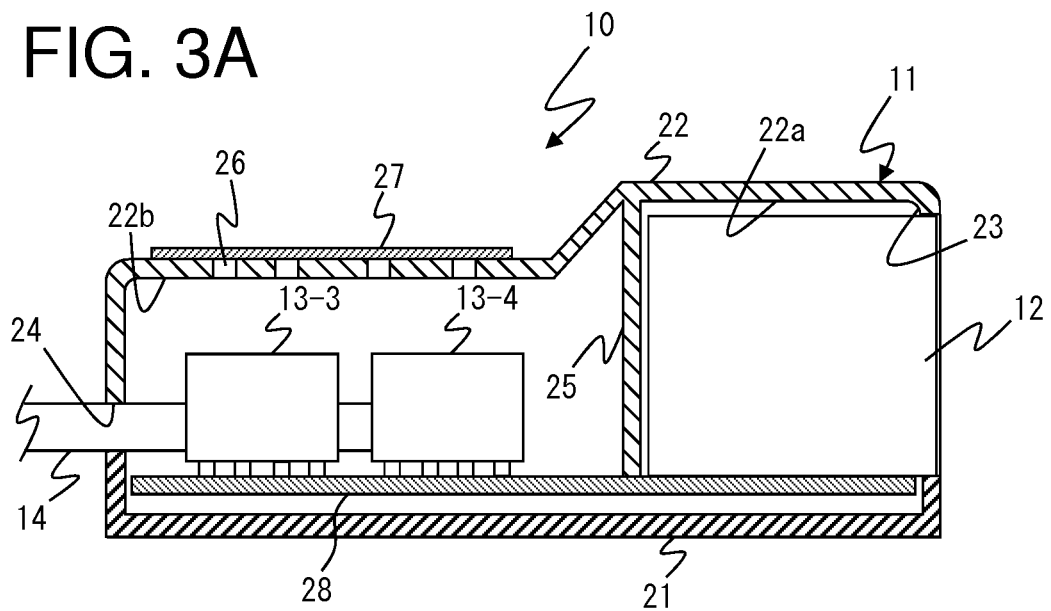
FIG. 3A and FIG. 3B are rough configuration diagrams illustrating the inside of the isolator 10 in FIG. 2B.
Figure 3B:
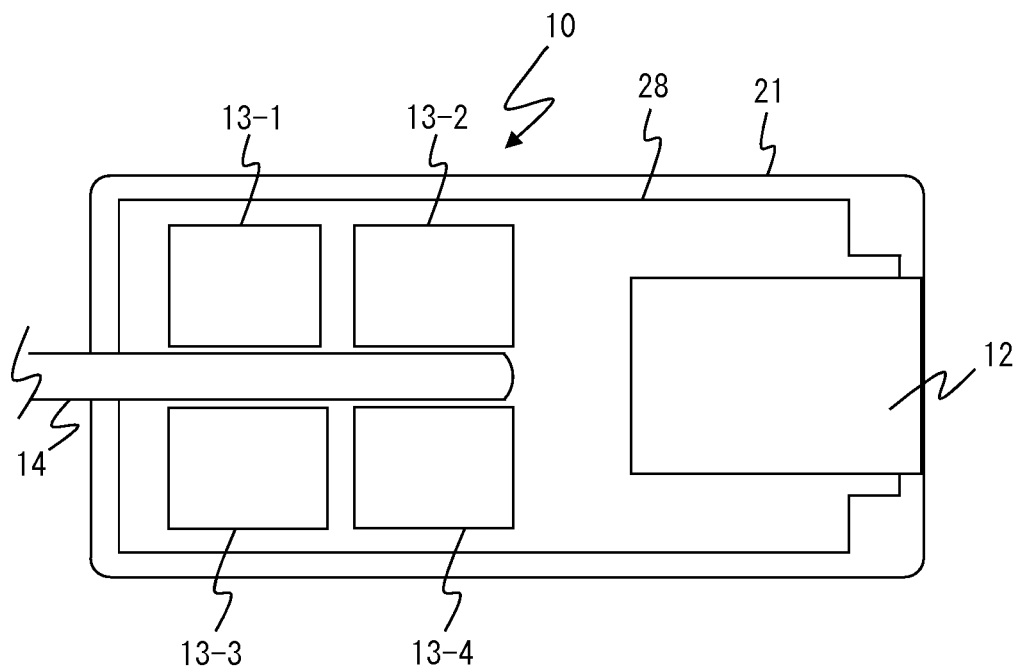

FIG. 2A and FIG. 2B are perspective views illustrating an outline of the isolator 10 in FIG. 1B, where FIG. 2A is the overall perspective view and FIG. 2B is a perspective view illustrating part of FIG. 2A. Further, FIG. 3A and FIG. 3B are rough configuration diagrams illustrating the inside of the isolator 10 in FIG. 2B, where FIG. 3A is a vertical cross-sectional view of the isolator 10 and FIG. 3B is a plan view illustrating the inside of the isolator 10.

The chassis 11 storing, for example, the isolation transformers 13-1 to 13-4 of the isolator 10 includes a lower member 21 having a substantially square plate shape and an upper member 22 having a substantially box shape in which the bottom surface to cover the surface of this lower member 21 is opened, and has a structure in which the upper member 22 is detachably fitted onto the lower member 21. A plug insertion opening unit 23 is formed in one side surface out of the facing side surfaces of the upper member 22. A cable pullout opening unit 24 is formed in the other side surface of the upper member 22 and the side surface of the lower member 21 to contact to this other side surface.

In the upper member 22, there is designed a shielding unit 25 to separate a modular jack storage space 22a and an isolation transformer storage space 22b. Further, in an upper surface corresponding to an outer surface of the upper member 22, multiple pressure release holes 26 are formed in a part corresponding to the isolation transformer storage space 22b in order to prevent a burst of the chassis 11 at abnormal time (i.e. at the time an inner pressure increases). In the upper surface of the upper member 22, a seal 27 is put on the parts in which the multiple holes 26 are formed, in a detachable or breakable manner, in order to prevent the degradation of withstand voltage performance due to invasion of dust or damp from the holes 26 into the inside of the chassis. The seal 27 has functions of: sealing the multiple holes 26 at normal time to prevent invasion of dust or damp; being removed or broken at abnormal time (i.e. at the time the inner pressure increases) of the chassis 11 and opening these holes 26 to let out the inner pressure; and preventing a burst of the chassis 11.

On the lower member 21, a printed circuit board 28 is attached. On the printed circuit board 28, the modular jack 12 is fixed to a part corresponding to the modular jack storage space 22a, and, furthermore, four isolation transformers 13-1 to 13-4 are fixed at predetermined intervals to a part corresponding to the isolation transformer storage space 22b. The terminal part of the LAN cable 14 is arranged between two isolation transformers 13-1 and 13-2 and two isolation transformers 13-3 and 13-4, and this LAN cable 14 is pulled out from the opening unit 24 to the outside. The space between four isolation transformers 13-1 to 13-4 and the modular jack 12 is shielded by the shielding unit 25. The terminal unit of the LAN cable 14, the isolation transformers 13-1 to 13-4 and the modular jack 12 are electrically connected to each other by a wiring pattern formed in the printed circuit board 28.

(Setting of Pressure Resistance Performance in First) Embodiment

Figure 4:
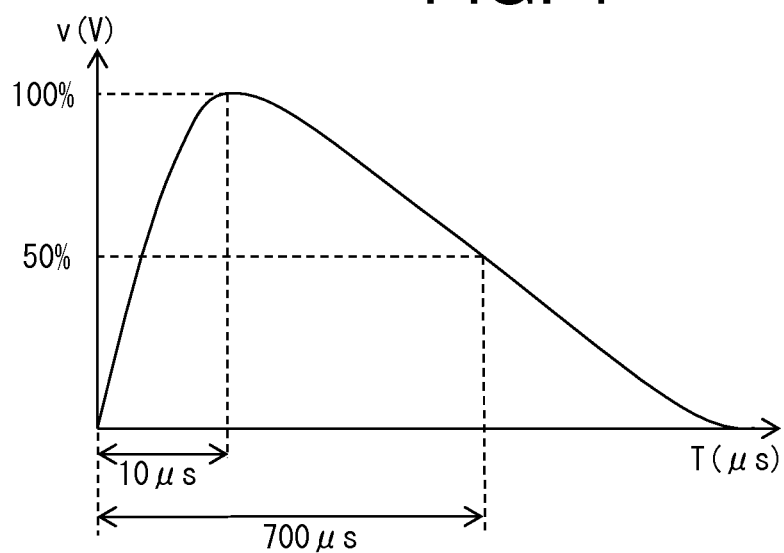
FIG. 4 is a schematic waveform diagram illustrating the definition of an impulse waveform (10/700 μs)

FIG. 4 is a schematic waveform diagram illustrating the definition of an impulse waveform (10/700 μs).

In this FIG. 4, the horizontal axis represents time T (μs) and the vertical axis represents a voltage v (V). For example, in a lightning surge of around 13 kV with an impulse waveform of 10/700 μs, the waveform reaches the maximum voltage of 13 kV at the timing a time of 10 μs passes from the rising start timing, and, after that, gradually attenuates, and, at the timing a time of 700 μs passes from the rising start timing, attenuates up to 7.5 kV, which is a half voltage of the maximum voltage of 13 kV.

Figure 5A:
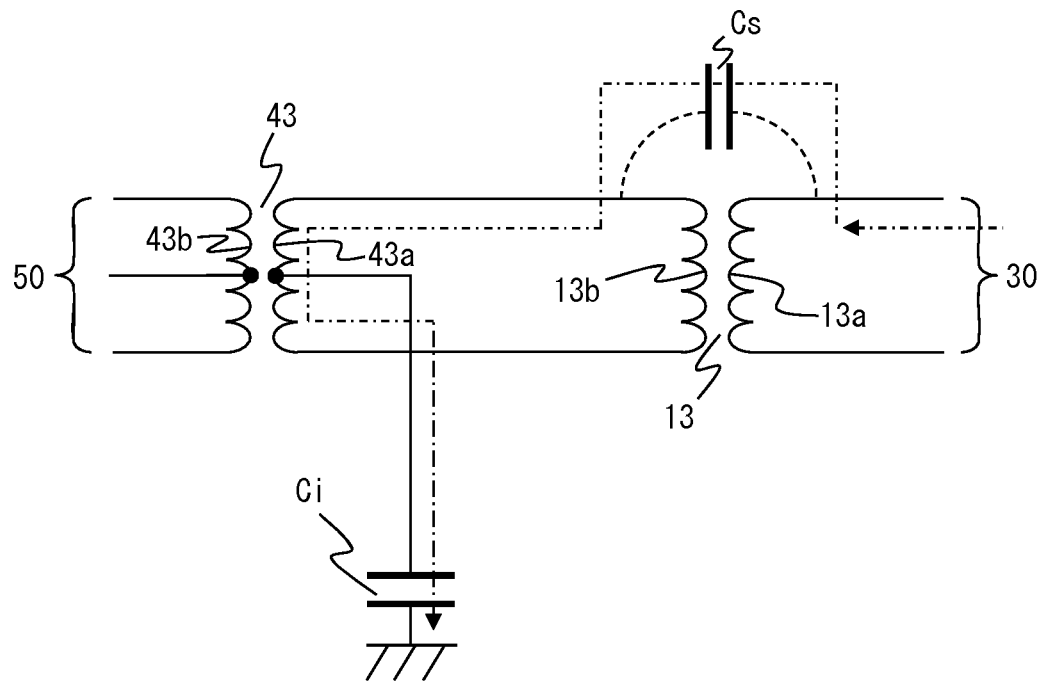
FIG. 5A and FIG. 5B are schematic diagrams illustrating equivalent circuits of capacities in FIG. 1A and FIG. 1B.
Figure 5B:
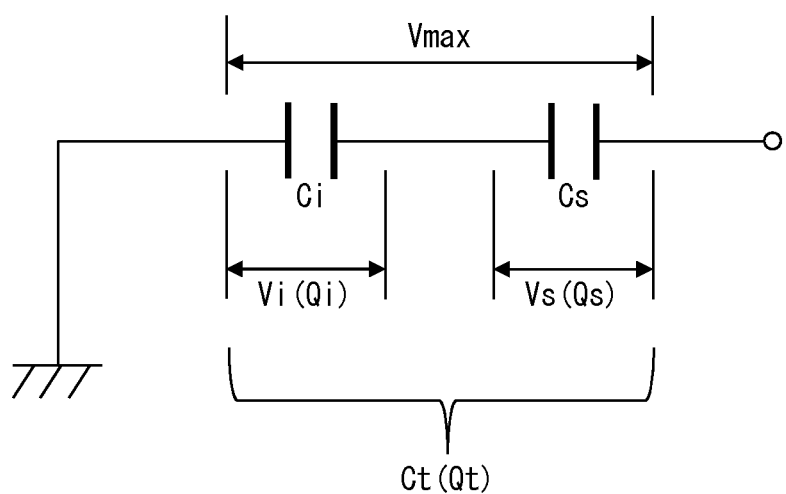

FIG. 5A and FIG. 5B are schematic diagrams illustrating equivalent circuits of the capacities in FIG. 1A and FIG. 1B, where FIG. 5A is a circuit diagram of the main components in FIG. 1A and FIG. 1B and FIG. 5B is an equivalent circuit diagram of the capacitance in FIG. 5A.

The parasitic capacitance Cs of each isolation transformer 13 in the isolator 10 and the inner capacitance Ci in the protection target device 40 are connected in series to the ground side. When an abnormal voltage Vmax such as a lightning surge is applied from the LAN cable 30 to the isolator 10, this abnormal voltage Vmax is divided by the parasitic capacitance Cs and the inner capacitance Ci, a divided voltage Vs is added to the parasitic capacitance Cs and a divided voltage Vi is added to the inner capacitance Ci.

A combined capacitance Ct of the parasitic capacitance Cs and the inner capacitance Ci connected in series is as follows:

$$Ct=(Cs \times Ci)/(Cs+Ci)$$

An electric charge Qt of the whole series circuit, an electric charge Qs of the parasitic capacitance Cs part and an electric charge Qi of the inner capacitance Ci part are as follows:

$$Qt=Ct \cdot V\text{max}$$

$$Qs=Cs \cdot Vs$$

$$Qi=Ci \cdot Vi$$

Since the electric charge Qt of the whole series circuit, the electric charge Qs of the parasitic capacitance Cs and the electric charge Qi of the inner capacitance Ci are equal, Qt=Qs=Qi is established. From the above equations, the divided voltages Vs and Vi are as following equations (1) and (2).

$$\begin{aligned} Vs &= Qs \cdot (1/Cs) \\ &= (Ct \cdot V\text{max}) \cdot (1/Cs) \\ &= [Ci/(Cs+Ci)] \cdot V\text{max} \end{aligned} \quad (1)$$

$$\begin{aligned} Vi &= Qi \cdot (1/Ci) \\ &= (Ct \cdot V\text{max}) \cdot (1/Ci) \\ &= [Cs/(Cs+Ci)] \cdot V\text{max} \end{aligned} \quad (2)$$

Next, specific examples (a) to (c) and test verification results (d) of the specific examples will be explained.

(a) Specific Example 1

The withstand voltage of the isolator 10 is set to around 13 kV, the withstand voltage of the protection target device 40 (i.e. inner capacitance Ci) is set to around 1.5 kV, and, furthermore, the electrostatic capacitance value of the inner capacitance Ci is set to 1000 pF.

For example, in a case where the electrostatic capacitance value of the parasitic capacitance Cs is set to 115 pF, when the abnormal voltage Vmax (=13 kV) is applied, the divided voltage Vi of the inner capacitance Ci, which is represented by equation (2), changes to Vi=[115/(115+1000)·13000≈1.34 kV. Accordingly, since the divided voltage Vi of the inner capacitance Ci is 1.34 kV below the withstand voltage 1.5 kV, the inner capacitance Ci is not damaged.

(b) Specific Example 2

The withstand voltage of the isolator 10 is set to around 13 kV, the withstand voltage of the protection target device 40 (i.e. inner capacitance Ci) is set to around 1.5 kV, and, furthermore, the electrostatic capacitance value of the inner capacitance Ci is set to 1000 pF.

For example, in a case where the electrostatic capacitance value of the parasitic capacitance Cs is set to 10 pF, when the abnormal voltage Vmax (=13 kV) is applied, the divided voltage Vi of the inner capacitance Ci, which is represented by equation (2), changes to Vi=[10/(10+1000)·13000≈129 kV. Accordingly, since the divided voltage Vi of the inner capacitance Ci is 129 V below the withstand voltage 1.5 kV, the inner capacitance Ci is not damaged.

(c) Specific Example 3

Similar to the specific example 2, the withstand voltage of the isolator 10 is set to around 13 kV, the withstand voltage of the protection target device 40 (i.e. inner capacitance Ci) is set to around 1.5 kV, and, furthermore, the electrostatic capacitance value of the inner capacitance Ci is set to 1000 pF.

For example, in a case where the electrostatic capacitance value of the parasitic capacitance Cs is set to 10 pF, when the abnormal voltage Vmax (=5400 V) is applied, the divided voltage Vi of the inner capacitance Ci, which is represented by equation (2), changes to Vi=[10/(10+1000)]·5400≈53V. Accordingly, since the divided voltage Vi of the inner capacitance Ci is 53 V below the withstand voltage 1.5 kV, the inner capacitance Ci is not damaged.

(d) Test Verification Results of Specific Examples

Figure 6A:
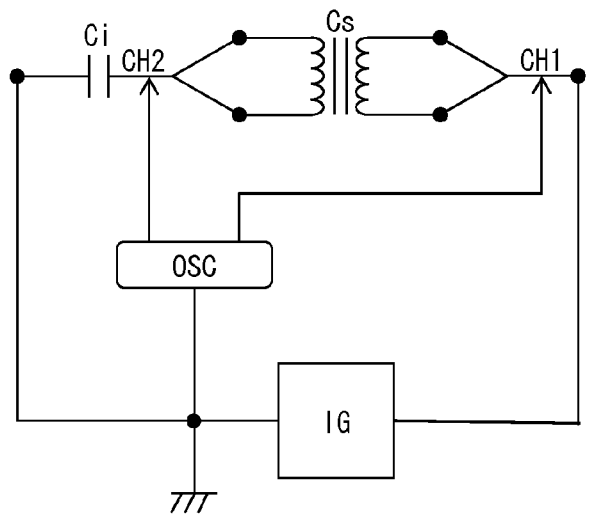
FIG. 6A, FIG. 6B and FIG. 6C are diagrams illustrating test verification results of capacitance in FIG. 5A and FIG. 5B.
Figure 6B:
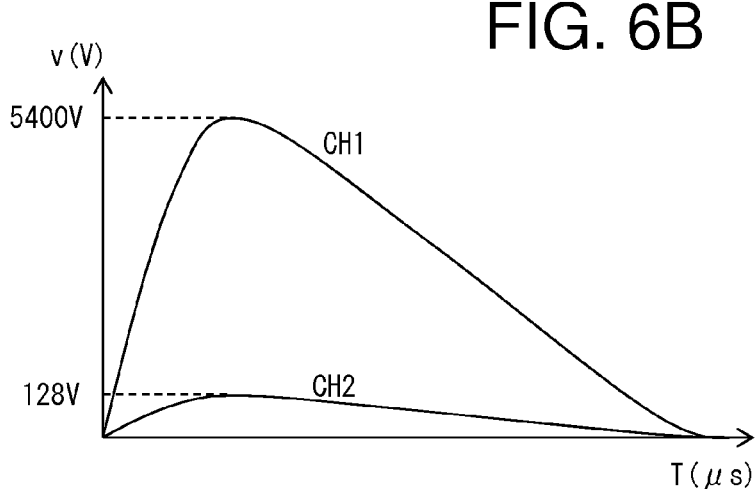
Figure 6C:
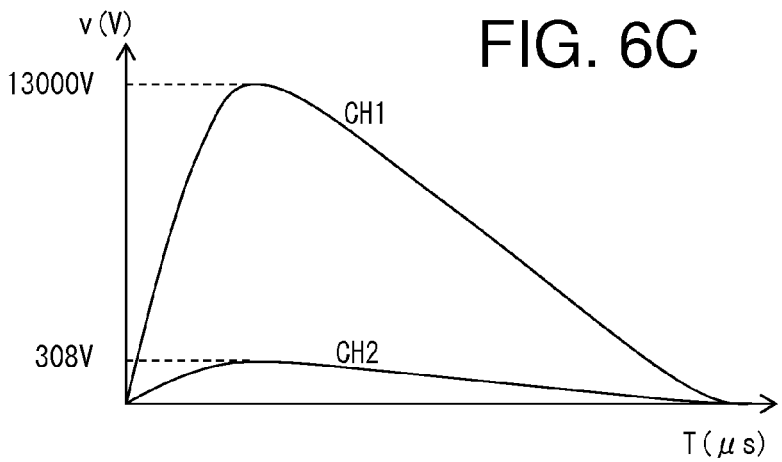

FIG. 6A, FIG. 6B and FIG. 6C are diagrams illustrating test verification results of the capacities in FIG. 5A and FIG. 5B, where FIG. 6A is a schematic diagram illustrating a test apparatus and, furthermore, FIG. 6B and FIG. 6C are waveform diagrams of the test verification results.

In FIG. 6A, similar to the specific example 3, using a high-frequency generator IG, 5400 V is applied between both ends of the series circuit formed with the parasitic capacitance Cs (=10 pF) and the inner capacitance Ci (=1000 pF), a voltage between both nodes CH1 and CH2 of the parasitic capacitance Cs is observed by an oscilloscope OSC and the waveform diagram of FIG. 6B is acquired. The voltage of the node CH1 is an applied voltage and the voltage of the node CH2 is a residual voltage of the inner capacitance Ci.

As clear from the waveform diagram of FIG. 6B, the divided voltage Vi of the inner capacitance Ci is 128 V. Therefore, the lightning surge attenuation rate is 128/5400=2.37/100=2.37%.

According to the test verification results, the divided voltage Vi of the inner capacitance Ci is 128 V, which is larger by 53 V than the theoretical value explained in the specific example 3. This may be because there is an electrostatic capacitance value of around 10 pF between the ground, the oscilloscope OSC and the node CH1 and between the ground, the oscilloscope OSC and the node CH2. In any event, since the divided voltage Vi of the inner capacitance Ci is below the withstand voltage 1.5 kV, the inner capacitance Ci is not damaged.

In view of these, if 13000 V (=13 kV) is applied between both ends of the series circuit formed with the parasitic capacitance Cs (=10 pF) and the inner capacitance Ci (=1000 pF), a voltage (=divided voltage Vi) appearing on the node CH2 of the inner capacitance Ci is estimated to be around 308 V based on the following equation, and, when this estimation waveform diagram is shown, it is as shown in FIG. 6C.

13000 V×0.0237=308 V

This estimated divided voltage Vi of 308 V is larger than 129 V which is the theoretical value explained in the specific example 2. This may be because, as described above, there is an electrostatic capacitance value of around 10 pF between the ground, the oscilloscope OSC and the node CH1 and between the ground, the oscilloscope OSC and the node CH2. In any event, since the divided voltage Vi of the inner capacitance Ci is below the withstand voltage 1.5 kV, the inner capacitance Ci is not damaged.

A feature of the first embodiment is to configure the isolator 10 using four isolation transformers 13-1 to 13-4 each having the parasitic capacitance Cs, such that the abnormal voltage Vmax is divided by the combined capacitance Ct and the divided voltage Vi of the inner capacitance Ci is equal to or below a predetermined value (e.g. equal to or below a withstand voltage of 1.5 V), where the combined capacitance Ct is formed by connecting the parasitic capacitance Cs of each isolation transformer 13 in the isolator 10 and the inner capacitance Ci in the protection target device 40 in series.

(Operation in First Embodiment)

An explanation will be given to an operation (I) at normal time and an operation (II) at abnormal time in the isolator 10 and the protection target device 40 illustrated in FIGS. 1A, 1B, 2A, 2B, 3A and 3B.

(I) Operation at Normal Time

In FIG. 1A and FIG. 1B, at the time of transmission in the protection target device 40, a transmission pulse signal output from the LAN controller 50 in the protection target device 40 is transmitted to the modular jack 42 via four pulse transformers 43-1 to 43-4. The transmission pulse signal transmitted to the modular jack 42 is transmitted to the modular jack 12 via the modular plug 15, the LAN cable 14 and four isolation transformers 13-1 to 13-4 on the side of the isolator 10. The transmission pulse signal transmitted to the modular jack 12 is transmitted to the LAN cable 30 via the modular plug 31.

Also, at the time of reception in the protection target device 40, a reception pulse signal transmitted from the LAN cable 30 is input in the modular jack 12 on the side of the isolator 10 via the modular plug 31. The reception pulse signal input in the modular jack 12 is transmitted to the modular jack 42 on the side of the protection target device 40 via four isolation transformers 13-1 to 13-4, the LAN cable 14 and the modular plug 15 in the isolator 10. The reception pulse signal transmitted to the modular jack 42 is received in the LAN controller 50 via four pulse transformers 43-1 to 43-4 in the protection target device 40.

(II) Operation at Abnormal Time

For example, the withstand voltage of the isolator 10 is set to around 13 kV. Further, the withstand voltage of the protection target device 40 (i.e. withstand voltage of the inner capacitance Ci) is set to around 1.5 kV and the electrostatic capacitance value is set to 1000 pF, and, in response to this, the electrostatic capacitance value of the parasitic capacitance Cs is set to 115 pF or 10 pF.

In a case where the abnormal voltage Vmax (e.g. 13 kV) such as a lightning surge enters from the LAN cable 30 into the side of the isolator 10, the current of the abnormal voltage Vmax passes from the primary winding 13a to the secondary winding 13b through capacitance coupling by the parasitic capacitance Cs of each isolation transformer 13 in the isolator 10.

The current of the abnormal voltage Vmax passing through the parasitic capacitance Cs of each isolation transformer 13 enters the protection target device 40 via the LAN cable 14, the modular plug 15 and the modular jack 42. The current of the abnormal voltage Vmax having entered the protection target device 40 is released to the ground side via the medium tap of the first winding 43a in each pulse transformer 43, each resistance 44 and the inner capacitance Ci. At this time, since the parasitic capacitance Cs and the inner capacitance Ci are connected in series to the ground side, the abnormal voltage Vmax is divided by the parasitic capacitance Cs and the inner capacitance Ci, the divided voltage Vs is added to the parasitic capacitance Cs and the divided voltage Vi is added to the inner capacitance Ci.

The electrostatic capacitance value of the inner capacitance Ci is set to 1000 pF, and, in response to this, the electrostatic capacitance value of the parasitic capacitance Cs is set to 115 pF or 10 pF. Therefore, since the divided voltage Vi of the inner capacitance Ci is below 1.5 kV, the inner capacitance Ci is not damaged.

Meanwhile, with respect to the withstand voltage performance system value of 13 kV in the isolator 10, if the abnormal voltage Vmax (e.g. 1.2/50 μs and 15 kV) such as a lightning surge enters from the LAN cable 30 into the side of the isolator 10, there are risks that: the isolation transformers 13 (=13-1 to 13-4) in the isolator 10 are subjected to breakdown; an excessive abnormal current (e.g. abnormal current at the time of this withstand voltage breakdown is 8/20 μs and 7.5 kA) is let out from the side of the primary winding 13a of these isolation transformers 13 to the side of the secondary winding 13b; and the protection target device 40 is broken. If such an abnormal current is flowed, in the chassis 11 storing the isolation transformers 13, thermal expansion of air due to the abnormal current causes a rapid increase of an inner pressure, the seal 27 sealing the hole 26 of the chassis 11 is removed or broken and the inner pressure is discharged from the hole 26 to the outside. By this means, it is possible to prevent a burst of the chassis 11.

Also, to protect the breakdown of the isolator 10 from the abnormal voltage Vmax equal to or above the withstand voltage as described above, the withstand voltage performance system value of the isolator 10 may be set to a value equal to or above 13 kV according to the predictable abnormal voltage Vmax.

(Effect of First Embodiment)

According to the first embodiment, following effects (i) and (ii) are provided.

(i) According to the first embodiment, the isolator 10 is formed using four isolation transformers 13-1 to 13-4 each having the parasitic capacitance Cs, such that the abnormal voltage Vmax is divided by the combined capacitance Ct and the divided voltage Vi of the inner capacitance Ci is equal to or below a predetermined value (e.g. equal to or below a withstand voltage of 1.5 V), where the combined capacitance Ct is formed by connecting the parasitic capacitance Cs of each isolation transformer 13 in the isolator 10 and the inner capacitance Ci in the protection target device 40 in series. Therefore, it is possible to simply and accurately realize the high-withstand-voltage isolation-type isolator 10, without applying the excessive divided voltage Vi to the side of the protection target device 40 and causing a bad effect of damaging the protection target device 40 even if the isolator 10 is subjected to a high withstand voltage.

(ii) To prevent a burst of the chassis 11 at abnormal time (i.e. at the time the inner pressure increases), the pressure release hole 26 is formed in this chassis 11 and this hole 26 is sealed by the seal 27. Therefore, at normal time, it is possible to prevent invasion of dust or damp from the hole 26 into the chassis 11, and, at abnormal time (i.e. at the time the inner pressure increases), since the seal 27 is removed or broken, it is possible to let out the inner pressure and prevent a burst of the chassis 11. Therefore, it is possible to realize the isolator 10 in which, regardless of the chassis 11 made of synthetic resin members, the chassis 11 is not burst even by an increase of the inner pressure.

Second Embodiment (Configuration in Second Embodiment)

Figure 7:
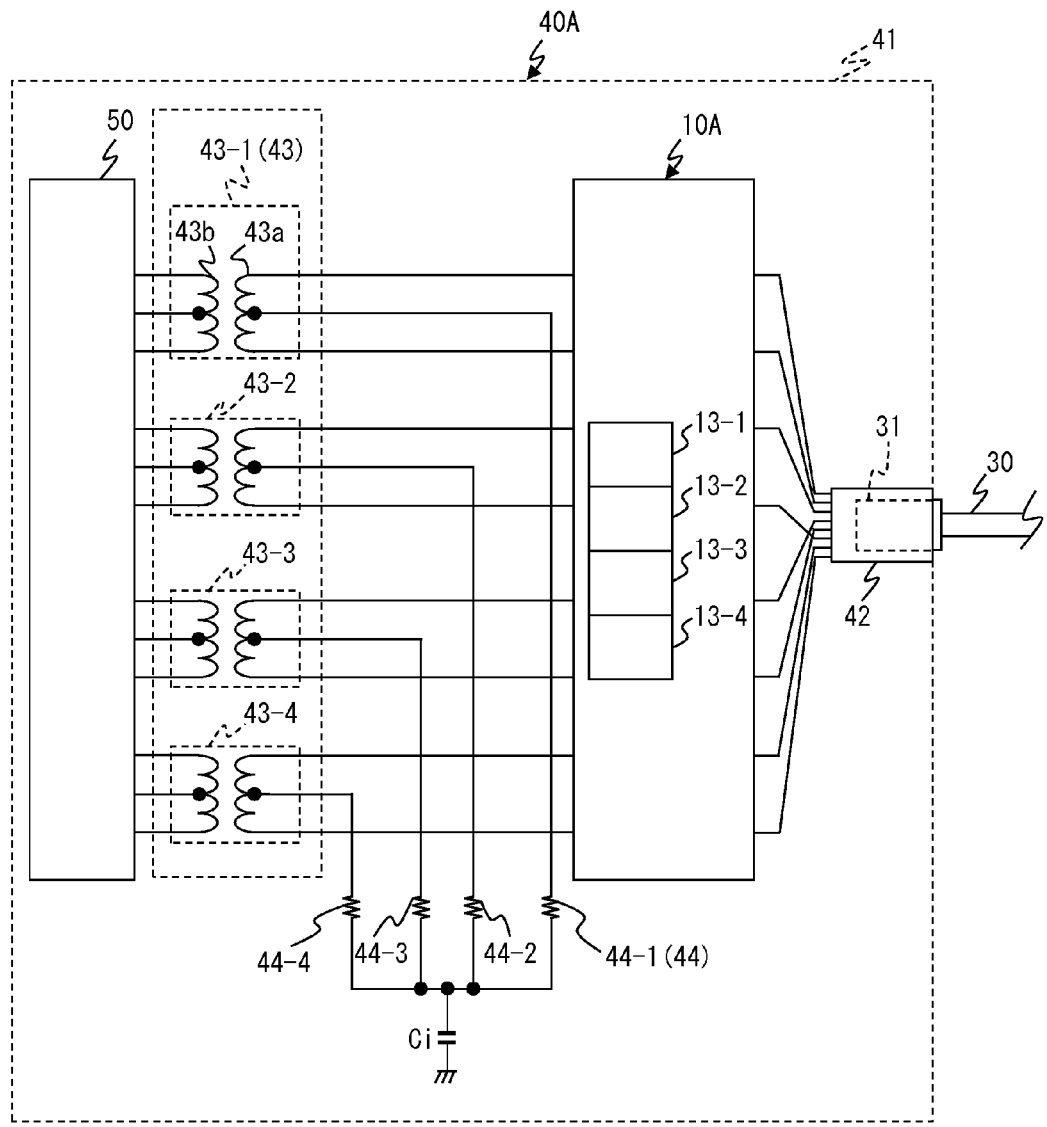
FIG. 7 is a rough circuit configuration diagram illustrating a communication line isolator 10A and a protection target device 40A according to a second embodiment of the present invention.

FIG. 7 is a rough circuit configuration diagram illustrating the communication line isolator 10A and the protection target device 40A according to the second embodiment of the present invention. In this FIG. 7, the same reference numerals are assigned to the same components as the components in FIGS. 1A and 1B illustrating the first embodiment.

The communication line isolator 10A according to the second embodiment is a built-in isolation-type LAN SPD (e.g. 1000Base-T SPD corresponding to gigabit Ethernet (registered trademark) standard) with high pressure resistance performance and without grounding. In this isolator 10A, four isolation transformers 13 (=13-1 to 13-4) forming the communication line isolator 10A are set in the chassis 41 storing the protection target device 40A corresponding to a communication device.

The eight-position modular jack 42 is attached to the side surface of the chassis 41 storing the protection target device 40A. The eight-position modular plug 31 connected to the LAN cable 30 is detachably attached to the modular jack 42. In the chassis 41, four input-output isolation transformers 13 (=13-1 to 13-4) forming the communication line isolator 10A, four input-output pulse transformers 43 (=43-1 to 43-4), four resistances 44 (=44-1 to 44-4) for impedance matching, the common inner capacitance Ci and the LAN controller 50 or the like are stored.

As illustrated in FIG. 1A, each isolation transformer 13 (=13-1 to 13-4) includes the primary winding 13a and the secondary winding 13b, where each primary winding 13a is connected to the modular jack 42 and each secondary winding 13b is connected to the primary winding 43a of each pulse transformer 43. Similar to FIG. 1B, the medium tap in the primary winding 43a of each pulse transformer 43 is grounded to a frame grounding terminal of the chassis 41 via each resistance 44 and the common inner capacitance Ci. For example, the resistance value of each resistance 44 is 75Ω and the capacitance value of the common inner capacitance Ci is 1000 pF. Further, the secondary winding 43b of each pulse transformer 43 is connected to the LAN controller 50.

(Setting of Withstand Voltage Performance in Second Embodiment)

The setting of withstand voltage performance in the second embodiment is set in the same way as in the first embodiment.

(Operation in Second Embodiment)

An explanation will be given to an operation (I) at normal time and an operation (II) at abnormal time in the second embodiment.

(I) Operation at Normal Time

Similar to the first embodiment, at the time of transmission in the protection target device 40A, a transmission pulse signal output from the LAN controller 50 is transmitted to the modular jack 42 via four pulse transformers 43-1 to 43-4 and four isolation transformers 13-1 to 13-4. The transmission pulse signal transmitted to the modular jack 42 is transmitted to the LAN cable 30 via the modular plug 31.

Also, at the time of reception in the protection target device 40A, a reception pulse signal transmitted from the LAN cable 30 is input in the modular jack 12 via the modular plug 31. The reception pulse signal input in the modular jack 42 is received in the LAN controller 50 via four isolation transformers 13-1 to 13-4 and four pulse transformers 43-1 to 43-4.

(II) Operation at Abnormal Time

Similar to the first embodiment, for example, the withstand voltage of the isolators 13 (=13-1 to 13-4) is set to around 13 kV. Further, the withstand voltage of the inner capacitance Ci is set to around 1.5 kV and the electrostatic capacitance value is set to 1000 pF, and, in response to this, the electrostatic capacitance value of the parasitic capacitance Cs is set to 115 pF or 10 pF.

In a case where the abnormal voltage Vmax (e.g. 13 kV) such as a lightning surge enters from the LAN cable 30, similar to the first embodiment, the current of the abnormal voltage Vmax passes from the primary winding 13a to the secondary winding 13b through capacitance coupling by the parasitic capacitance Cs of each isolation transformer 13. The current of the abnormal voltage Vmax passing through the parasitic capacitance Cs of each isolation transformer 13 is released to the ground side via the medium tap of the first winding 43a in each pulse transformer 43, each resistance 44 and the inner capacitance Ci. At this time, since the parasitic capacitance Cs and the inner capacitance Ci are connected in series to the ground side, the abnormal voltage Vmax is divided by the parasitic capacitance Cs and the inner capacitance Ci, the divided voltage Vs is added to the parasitic capacitance Cs and the divided voltage Vi is added to the inner capacitance Ci.

The electrostatic capacitance value of the inner capacitance Ci is set to 1000 pF, and, in response to this, the electrostatic capacitance value of the parasitic capacitance Cs is set to 115 pF or 10 pF. Therefore, since the divided voltage Vi of the inner capacitance Ci is below 1.5 kV, the inner capacitance Ci is not damaged.

Meanwhile, with respect to the withstand voltage performance system value of 13 kV in the isolator 10, if the abnormal voltage Vmax (e.g. 1.2/50 μs and 15 kV) such as a lightning surge enters from the LAN cable 30, there are risks that: the isolation transformers 13 (=13-1 to 13-4) are subjected to breakdown; an excessive abnormal current is let out from the side of the primary winding 13a of these isolation transformers 13 to the side of the secondary winding 13b; and the protection target device 40A is broken. To protect the breakdown of the protection target device 40A from the abnormal voltage Vmax equal to or above the withstand voltage as described above, the withstand voltage performance system value of the isolation transformer 13 may be set to a value equal to or above 13 kV according to the predictable abnormal voltage Vmax. Also, in a case where there is a risk that the chassis 41 is burst by thermal expansion of air in the chassis 41 due to such an abnormal current, for example, similar to the first embodiment, it may be possible to adopt a preventative measure of forming the pressure release hole 26 in the side surface of the chassis 41 and sealing this hole 26 by the seal 27.

(Effect of Second Embodiment)

According to the second embodiment, the similar effect to the effect (i) in the first embodiment is provided. Further, four isolation transformers 13 (=13-1 to 13-4) forming the communication line isolator 10A are incorporated in the chassis 41 on the side of the protection target device 40A. Therefore, by omitting components such as the LAN cable 14 and the modular plug 15 illustrated in FIG. 1A, it is possible to downsize the whole device.

Third Embodiment (Configuration in Third Embodiment)

Figure 8B:
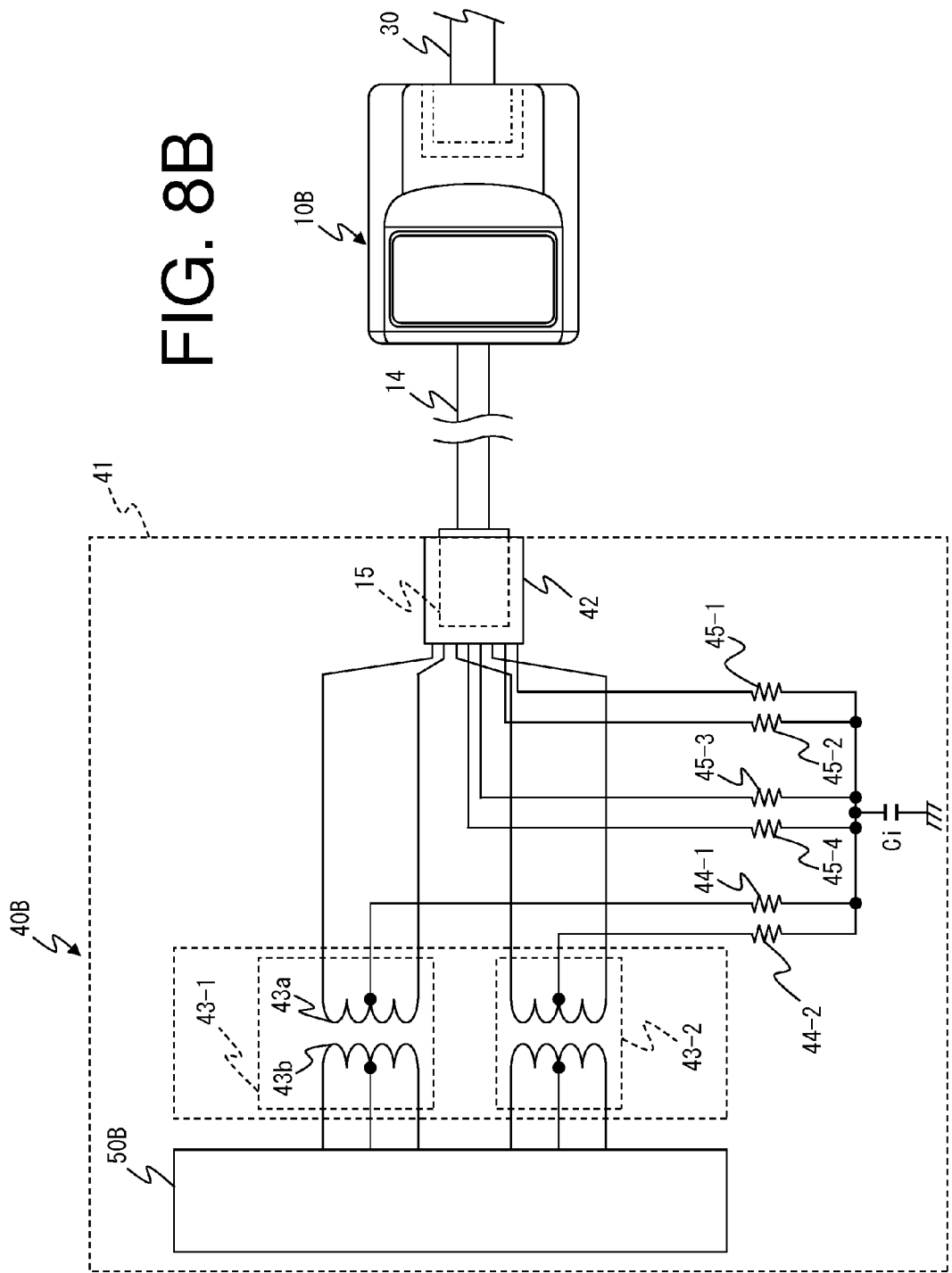
FIG. 8B is a rough circuit configuration diagram illustrating a protection target device 40B according to the third embodiment of the present invention.

FIG. 8A is a rough circuit configuration diagram illustrating a communication line isolator 10B according to the third embodiment of the present invention and FIG. 8B is a rough circuit configuration diagram illustrating the protection target device 40B according to the third embodiment. In these FIG. 8A and FIG. 8B, the same reference numerals are assigned to the same components as the components in FIGS. 1A and 1B illustrating the first embodiment.

The communication line isolator 10B according to the third embodiment is an external isolation-type LAN SPD (e.g. 10Base-T or 100Base-TX SPD corresponding to Ethernet (registered trademark) standard) with high pressure resistance performance and without grounding. This isolator 10B is detachably connected between the LAN cable 30 and the protection target device 40B corresponding to a communication device.

Similar to the first embodiment, the isolator 10B has the chassis 11 formed with an isolation member (e.g. synthetic resin member), and the modular jack 12 is attached to the side surface of this chassis 11. In the chassis 11, the transmission isolation transformer 13-1 and the reception isolation transformer 13-2 are stored. The isolation transformers 13-1 and 13-2 each include the primary winding 13a and the secondary winding 13b, where each primary winding 13a is connected to the modular jack 12 and each secondary winding 13b is connected to the one end of the LAN cable 14. Similar to the first embodiment, there is the parasitic capacitance Cs between the primary winding 13a and the secondary winding 13b of the isolation transformers 13-1 and 13-2. Similar to the first embodiment, the other end of the LAN cable 14 is pulled out from the side surface of the chassis 11 to the outside, and the modular plug 15 is connected to the other end of the LAN cable 14. The modular plug 15 is detachably attached to the protection target device 40B.

Similar to the first embodiment, the protection target device 40B includes, for example, an ONU, an HGW and a PC, and each component is stored in the chassis 41 as follows. The modular jack 42 is attached to the side surface of the chassis 41. In the chassis 41, the transmission pulse transformer 43-1, the reception pulse transformer 43-2, six resistances 44-1, 44-2 and 45-1 to 45-4 for impedance matching, the common inner capacitance Ci and the LAN controller 50B as an inner circuit or the like are stored.

Similar to the first embodiment, the pulse transformers 43-1 and 43-2 each include the primary winding 43a and the secondary winding 43b, each primary winding 43a is connected to the modular jack 42 and each secondary winding 43b is connected to the LAN controller 50B. The medium tap in the primary winding 43a of each of the pulse transformers 43-1 and 43-2 is grounded to a frame grounding terminal of the chassis 41 via the resistances 44-1 and 44-2 and the common inner capacitance Ci. Four available electrodes of the modular jack 42 are grounded to the frame grounding terminal of the chassis 41 via the resistances 45-1 to 45-4 and the common inner capacitance Ci. Similar to the first embodiment, for example, the resistance value of each of the resistances 44-1, 44-2 and 45-1 to 45-4 is 75Ω and the capacitance value of the common inner capacitance Ci is 1000 pF.

The LAN controller 50B has a transmission and reception function to transmit and receive a transmission pulse signal and reception pulse signal in a switching manner. This LAN controller 50B is configured to: at the time of transmission, transmit a transmission pulse signal generated in a non-illustrated protection target device itself to the transmission pulse transformer 43-1; and, at the time of reception, receive a reception pulse signal transmitted from the reception pulse transformer 43-2 and give it to the non-illustrated protection target device itself.

Other configurations are similar to the first embodiment.

(Setting of Withstand Voltage Performance in Third Embodiment)

The setting of withstand voltage performance in the third embodiment is set in a similar way to the first embodiment.

(Operation in Third Embodiment)

An explanation will be given to an operation (I) at normal time and an operation (II) at abnormal time in the third embodiment.

(I) Operation at Normal Time

At the time of transmission in the protection target device 40B, a transmission pulse signal output from the LAN controller 50B is transmitted to the modular jack 12 via the transmission pulse transformer 43-1, the modular jack 42, the modular plug 15, the LAN cable 14 and the transmission isolation transformer 13-1. The transmission pulse signal transmitted from the modular jack 12 is transmitted to the LAN cable 30 via the modular plug 31.

Also, at the time of reception in the protection target device 40B, a reception pulse signal transmitted from the LAN cable 30 is received in the LAN controller 50B via the modular plug 31, the modular jack 12, the reception isolation transformer 13-2, the LAN cable 14, the modular plug 15, the modular jack 42 and the reception pulse transformer 43-2.

(II) Operation at Abnormal Time

Similar to the first embodiment, for example, the withstand voltage of the isolation transformers 13-1 and 13-2 is set to around 13 kV. Further, the withstand voltage of the inner capacitance Ci is set to around 1.5 kV and the electrostatic capacitance value is set to 1000 pF, and, in response to this, the electrostatic capacitance value of the parasitic capacitance Cs is set to 115 pF or 10 pF.

In a case where the abnormal voltage Vmax (e.g. 13 kV) such as a lightning surge enters from the LAN cable 30, similar to the first embodiment, the current of the abnormal voltage Vmax passes from the primary winding 13a to the secondary winding 13b through capacitance coupling by the parasitic capacitance Cs of the isolation transformers 13-1 and 13-2. The current of the abnormal voltage Vmax passing through the parasitic capacitance Cs of the isolation transformers 13-1 and 13-2 is released to the ground side via the medium tap of the first winding 43a in the pulse transformers 43-1 and 43-2, the resistances 44-1 and 44-2 and the inner capacitance Ci. At this time, since the parasitic capacitance Cs and the inner capacitance Ci are connected in series to the ground side, the abnormal voltage Vmax is divided by the parasitic capacitance Cs and the inner capacitance Ci, the divided voltage Vs is added to the parasitic capacitance Cs and the divided voltage Vi is added to the inner capacitance Ci.

The electrostatic capacitance value of the inner capacitance Ci is set to 1000 pF, and, in response to this, the electrostatic capacitance value of the parasitic capacitance Cs is set to 115 pF or 10 pF. Therefore, since the divided voltage Vi of the inner capacitance Ci is below 1.5 kV, the inner capacitance Ci is not damaged.

Meanwhile, with respect to the withstand voltage performance system value of 13 kV in the isolator 10B, if the abnormal voltage Vmax (e.g. 1.2/50 μs and 15 kV) such as a lightning surge enters from the LAN cable 30, similar to the first embodiment, there are risks that: the isolation transformers 13-1 and 13-2 are subjected to breakdown; an excessive abnormal current is let out from the side of the primary winding 13a of these isolation transformers 13-1 and 13-2 to the side of the secondary winding 13b; and the protection target device 40B is broken. If such an abnormal current is flowed, in the chassis 11 storing the isolation transformers 13-1 and 13-2, thermal expansion of air due to the abnormal current causes a rapid increase of an inner pressure, the seal 27 sealing the hole 26 of the chassis 11 is removed or broken and the inner pressure is discharged from the hole 26 to the outside. By this means, it is possible to prevent a burst of the chassis 11.

Also, similar to the first embodiment, to protect the breakdown of the isolator 10B from the abnormal voltage Vmax equal to or above the withstand voltage as described above, the withstand voltage performance system value of the isolator 10B may be set to a value equal to or above 13 kV according to the predictable abnormal voltage Vmax.

(Effect of Third Embodiment)

According to the third embodiment, the similar effects to the effects (i) and (ii) in the first embodiment are provided.

Fourth Embodiment (Configuration in Fourth Embodiment)

Figure 9:
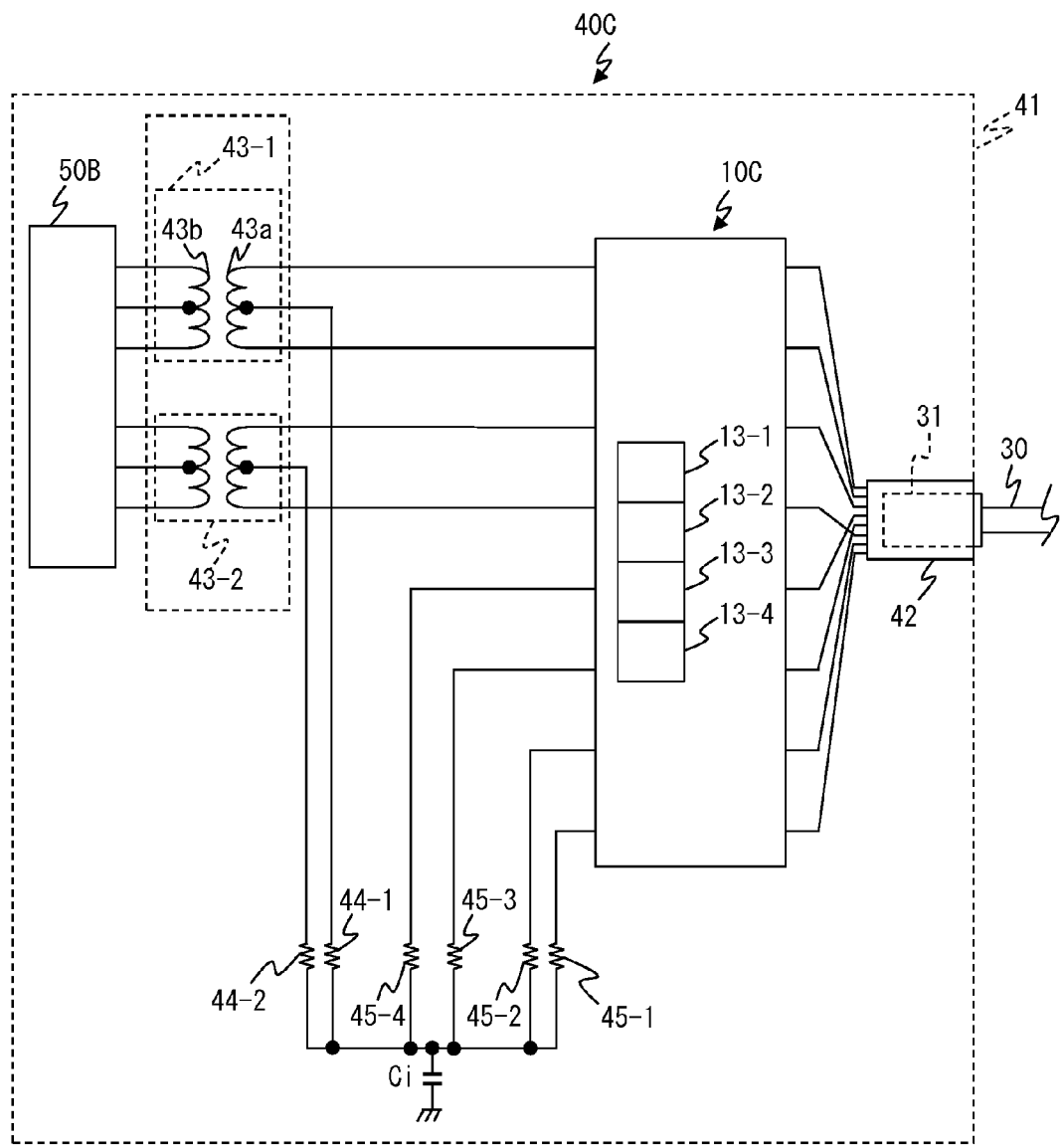
FIG. 9 is a rough circuit configuration diagram illustrating a communication line isolator 10C and a protection target device 40C according to a fourth embodiment of the present invention.

FIG. 9 is a rough circuit configuration diagram illustrating the communication line isolator 10C and the protection target device 40C according to the fourth embodiment of the present invention. In this FIG. 9, the same reference numerals are assigned to the same components as the components in FIGS. 8A and 8B illustrating the third embodiment.

The communication line isolator 10C according to the fourth embodiment is a built-in isolation-type LAN SPD (e.g. 10Base-T or 100Base-TX SPD corresponding to Ethernet (registered trademark) standard) with high pressure resistance performance and without grounding. In this isolator 10C, the transmission isolation transformer 13-1 and the reception isolation transformer 13-2 forming the communication line isolator 10C are set in the chassis 41 storing the protection target device 40C corresponding to a communication device.

The modular jack 42 is attached to the side surface of the chassis 41 storing the protection target device 40C. The modular plug 31 connected to the LAN cable 30 is detachably attached to the modular jack 42. In the chassis 41, the transmission isolation transformer 13-1 and the reception isolation transformer 13-2 forming the communication line isolator 10C, the transmission pulse transformer 43-1 and the reception pulse transformer 43-2, six resistances 44-1, 44-2 and 45-1 to 45-4 for impedance matching, the common inner capacitance Ci and the LAN controller 50B as an inner circuit or the like are stored.

As illustrated in FIG. 8A, the isolation transformers 13-1 and 13-2 each include the primary winding 13a and the secondary winding 13b, where each primary winding 13a is connected to the modular jack 42 and each secondary winding 13b is connected to the primary winding 43a of each of the pulse transformers 43-1 and 43-2. Similar to FIG. 8B, the medium tap in the primary winding 43a of each of the pulse transformers 43-1 and 43-2 is grounded to a frame grounding terminal of the chassis 41 via the resistances 44-1 and 44-2 and the common inner capacitance Ci. Similar to the third embodiment, four available electrodes of the modular jack 42 are grounded to the frame grounding terminal of the chassis 41 via the resistances 45-1 to 45-4 and the common inner capacitance Ci. Similar to the third embodiment, for example, the resistance value of each of the resistances 44-1, 44-2 and 45-1 to 45-4 is 75Ω and the capacitance value of the common inner capacitance Ci is 1000 pF. Further, the secondary winding 43b of the pulse transformers 43-1 and 43-2 is connected to the LAN controller 50B.

(Setting of Withstand Voltage Performance in Fourth Embodiment)

The setting of withstand voltage performance in the fourth embodiment is set in the same way as the third embodiment.

(Operation in Fourth Embodiment)

An operation at normal time and an operation at abnormal time in the fourth embodiment are substantially the same as the third embodiment.

Also, as the operation at abnormal time, similar to the second embodiment, with respect to a withstand voltage performance system value of 13 kV in the isolation transformers 13-1 and 13-2, if the abnormal voltage Vmax (e.g. 1.2/50 μs and 15 kV) such as a lightning surge enters from the LAN cable 30, there are risks that: the isolation transformers 13-1 and 13-2 are subjected to breakdown; an excessive abnormal current is let out from the side of the primary winding 13a of these isolation transformers 13-1 and 13-2 to the side of the secondary winding 13b; and the protection target device 40C is broken. To protect the breakdown of the protection target device 40C from the abnormal voltage Vmax equal to or above the withstand voltage as described above, the withstand voltage performance system value of the isolation transformers 13-1 and 13-2 may be set to a value equal to or above 13 kV according to the predictable abnormal voltage Vmax. Also, in a case where there is a risk that the chassis 41 is burst by thermal expansion of air in the chassis 41 due to such an abnormal current, for example, similar to the first embodiment, it may be possible to adopt a preventative measure of forming the pressure release hole 26 in the side surface of the chassis 41 and sealing this hole 26 by the seal 27.

(Result of Fourth Embodiment)

According to the fourth embodiment, the similar effect to the effect (i) in the first embodiment is provided. Further, two isolation transformers 13-1 and 13-2 forming the communication line isolator 10C are incorporated in the chassis 41 on the side of the protection target device 40C. Therefore, by omitting components such as the LAN cable 14 and the modular plug 15 illustrated in FIG. 8A, it is possible to downsize the whole device.

Fifth Embodiment

Figure 10:
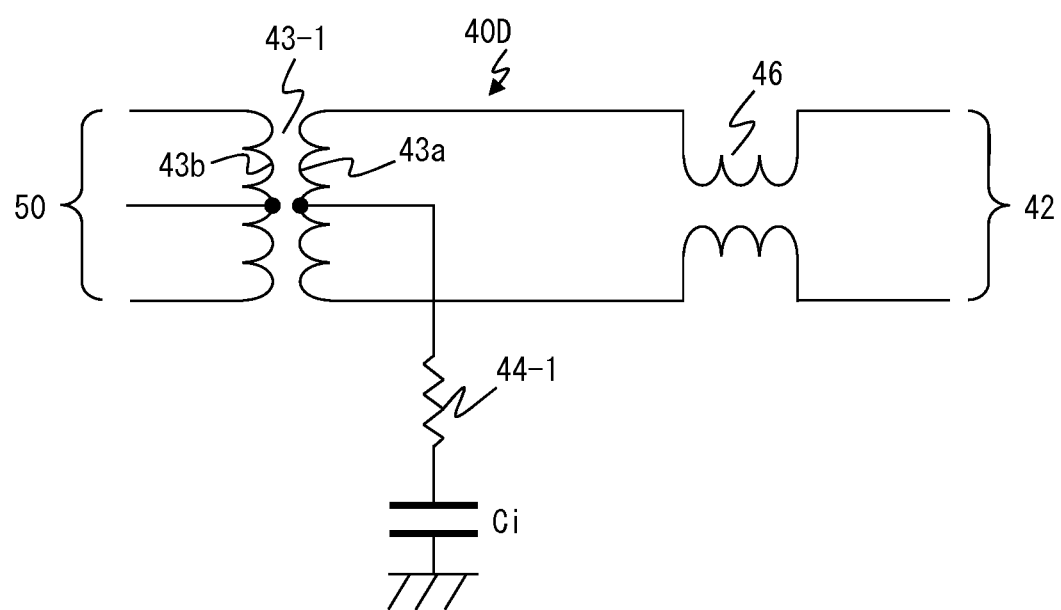
FIG. 10 is a rough circuit configuration diagram illustrating main components of a protection target device 40D according to a fifth embodiment of the present invention.

FIG. 10 is a rough circuit configuration diagram illustrating main components of a protection target device 40D according to the fifth embodiment of the present invention. In this FIG. 10, the same reference numerals are assigned to the same components as the components in FIGS. 1A and 1B illustrating the first embodiment.

In the protection target device 40D according to the fifth embodiment, a common mode choke coil 46 is connected in series between the modular jack 42 and the primary winding 43a of the pulse transformer 43-1. Similarly, although it is not illustrated, the common mode choke coil 46 is connected in series between the modular jack 42 and the primary winding 43a of each of the other pulse transformers 43-2 to 43-4. By setting such the common mode choke coil 46, a common mode noise is suppressed and the performance of the protection target device 40D is improved.

Also, if the above modular jack 42 is also provided in the second embodiment, the third embodiment and the fourth embodiment, the performance of the protection target devices 40A, 40B and 40C is improved.

Other Variation Example of First to Fifth Embodiments

The present invention is not limited to the above first to fifth embodiments and various utility forms or variations are possible. As these utility forms or variation examples, for example, there are following (a) to (c).

(a) The communication line isolators 10, 10A, 10B and 10C and the protection target devices 40, 40A, 40B, 40C and 40D according to the first to fifth embodiments may be changed to other circuits or configurations than those in the drawings. For example, in FIG. 1A or FIG. 8A, it may be changed to a configuration in which the LAN cable 14 is omitted and the modular plug 15 is attached to the side surface of the chassis 11. Also, the resistances 44-1 to 44-3 and 45-1 to 45-4 in the protection target devices 40, 40A, 40B, 40C and 40D may be omitted. Further, in FIG. 3A and FIG. 3B, although the isolation transformer 13 is packaged every line like the isolation transformers 13-1 to 13-4, they may be collectively packaged for all lines.

(b) A synthetic resin member forming the chassis 11 may be changed to other isolation members such as ceramics.

(c) In the first to fifth embodiments, although an explanation is given to the communication line isolators 10, 10A, 10B and 10 C with respect to the LAN cable 30, the communication line isolator of the present invention is applicable to other communication lines than the LAN cable 30.

What is claimed is:

1. A communication line isolator that is configured with an isolation transformer including a primary winding connected to a communication line and a secondary winding connected to a protection target device that performs communication with the communication line, and blocks a lightning surge voltage entering from the communication line to protect the protection target device, wherein:

the protection target device has a pulse transformer and an inner circuit to transmit/receive a pulse signal to/from the communication line via the pulse transformer and perform the communication, the pulse transformer includes a primary winding connected to a side of the secondary winding of the isolation transformer and a secondary winding connected to the inner circuit side of the protection target device, and a medium tap in the primary winding of the pulse transformer is grounded through an inner capacitance of the protection target device; and a parasitic capacitance caused between the primary winding and the secondary winding in the isolation transformer and the inner capacitance are connected in series such that the lightning surge voltage is divided by the parasitic capacitance and the inner capacitance, and a capacitance value of the parasitic capacitance is set such that a divided voltage of the inner capacitance is equal to or below a predetermined value.

2. The communication line isolator according to claim 1, wherein:

the isolation transformer is stored in a chassis formed with an isolation member and is externally attached to the protection target device;

a pressure release hole is formed in an outer surface of the chassis; and the hole is sealed by a seal that can be opened when an inner pressure of the chassis increases.

3. The communication line isolator according to claim 2, wherein the isolation member is a synthetic resin member.

4. The communication line isolator according to claim 1, wherein the isolation transformer is incorporated in the protection target device.

5. The communication line isolator according to claim 1, wherein the medium tap is grounded through a resistance for impedance matching and the inner capacitance.

6. The communication line isolator according to claim 1, wherein the primary winding of the pulse transformer is connected to the side of the secondary winding of the isolation transformer through a common mode choke coil.

7. The communication line isolator according to claim 1, wherein the communication line is a local area network.

8. The communication line isolator according to claim 5, wherein the primary winding of the pulse transformer is connected to the side of the secondary winding of the isolation transformer through a common mode choke coil.

9. The communication line isolator according to claim 2, further comprising:

the isolation transformer;

a first input/output connector that is connected to the primary winding of the isolation transformer and detachably connected to the communication line; and a second input/output connector that is connected to the secondary winding of the isolation transformer and detachably connected to the protection target device, wherein:

the isolation transformer and the first connector are stored in the chassis; and the second connector is pulled out from the chassis by a cable.

10. The communication line isolator according to claim 3, further comprising:

the isolation transformer;

a first input/output connector that is connected to the primary winding of the isolation transformer and detachably connected to the communication line; and a second input/output connector that is connected to the secondary winding of the isolation transformer and detachably connected to the protection target device, wherein:

the isolation transformer and the first connector are stored in the chassis; and the second connector is pulled out from the chassis by a cable.

11. The communication line isolator according to claim 3, further comprising:

the isolation transformer;

a first input/output connector that is connected to the primary winding of the isolation transformer and detachably connected to the communication line; and a second input/output connector that is connected to the secondary winding of the isolation transformer and detachably connected to the protection target device, wherein the isolation transformer, the first connector and the second connector are stored in the chassis.

* * * * *